United States Patent

Sure et al.

(10) Patent No.: US 11,274,815 B1
(45) Date of Patent: Mar. 15, 2022

(54) SINGLE MOTOR, TWO AXIS SEARCHLIGHT SYSTEM

(71) Applicant: HONEYWELL INTERNATIONAL INC., Charlotte, NC (US)

(72) Inventors: Anita Sure, Bangalore (IN); Harish Nagarajaiah, Bangalore (IN); Gowtham Vankayala, Bangalore (IN); Raghuveer Desai, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/232,260

(22) Filed: Apr. 16, 2021

(30) Foreign Application Priority Data

Mar. 3, 2021 (IN) .............................. 202111008897

(51) Int. Cl.
| | |
|---|---|
| *F21V 21/15* | (2006.01) |
| *F21V 23/00* | (2015.01) |
| *F21V 5/00* | (2018.01) |
| *B64D 47/02* | (2006.01) |
| *F21Y 105/10* | (2016.01) |
| *F21Y 113/10* | (2016.01) |

(52) U.S. Cl.
CPC .............. *F21V 21/15* (2013.01); *F21V 5/008* (2013.01); *F21V 23/003* (2013.01); *B64D 47/02* (2013.01); *F21Y 2105/10* (2016.08); *F21Y 2113/10* (2016.08)

(58) Field of Classification Search
CPC ......... F21V 23/15; F21V 5/008; F21V 23/003
USPC ....................................................... 362/235
See application file for complete search history.

(56) References Cited

U.S. PATENT DOCUMENTS

| | | | | |
|---|---|---|---|---|
| 3,751,654 | A * | 8/1973 | Grebinar ................. | F21V 21/26 362/401 |
| 5,585,783 | A * | 12/1996 | Hall ......................... | B60Q 7/00 340/473 |
| 6,315,435 | B1 | 11/2001 | Hamilton et al. | |
| 7,771,247 | B2 * | 8/2010 | Kessler ................... | A63H 33/26 446/242 |
| 8,274,226 | B1 * | 9/2012 | Sikora ...................... | B60Q 1/24 315/77 |
| 10,670,249 | B1 | 6/2020 | Brahmbhatt et al. | |
| 10,738,972 | B1 * | 8/2020 | Kelly ................... | A63H 33/008 |

(Continued)

FOREIGN PATENT DOCUMENTS

| | | |
|---|---|---|
| CN | 110712752 A | 1/2020 |
| CN | 212023010 U | 11/2020 |

*Primary Examiner* — Bryon T Gyllstrom
(74) *Attorney, Agent, or Firm* — Lorenz & Kopf, LLP

(57) ABSTRACT

A single motor, two axis searchlight system includes a shaft, a motor, at least a first plurality of light sources, and a controller. The shaft is mounted for rotation about a rotational axis. The motor is coupled to the shaft and is operable to rotate the shaft about the rotational axis. The first plurality of light sources are coupled to the shaft and are rotatable therewith about the rotational axis. The first plurality of light sources are disposed along a first plane that is disposed at a first angle relative to the rotational axis. The controller is in operable communication with the motor and the first plurality of light sources. The controller configured to: selectively energize the motor to thereby cause the first plurality of light sources to rotate about the rotational axis, and selectively energize one or more of the first plurality of light sources.

12 Claims, 8 Drawing Sheets

(56) References Cited

U.S. PATENT DOCUMENTS

| | | | |
|---|---|---|---|
| 2005/0052863 A1* | 3/2005 | Kim | G09F 9/33 |
| | | | 362/232 |
| 2010/0232159 A1* | 9/2010 | Lai | F21V 14/06 |
| | | | 362/277 |
| 2013/0128565 A1* | 5/2013 | Cugini | F21L 4/02 |
| | | | 362/184 |
| 2014/0146517 A1* | 5/2014 | Ng | F21V 9/45 |
| | | | 362/84 |
| 2014/0369060 A1* | 12/2014 | Zhang | F21S 43/14 |
| | | | 362/542 |
| 2015/0016106 A1* | 1/2015 | Belliveau | F21V 23/0435 |
| | | | 362/233 |
| 2015/0036365 A1 | 2/2015 | Schoen et al. | |
| 2015/0078018 A1 | 3/2015 | Lapujade et al. | |
| 2016/0076722 A1 | 3/2016 | Hessling von Heimendahl | |
| 2016/0131356 A1* | 5/2016 | Engberg | F21V 21/14 |
| | | | 362/373 |
| 2019/0368702 A1* | 12/2019 | Sousa | F21S 41/657 |

\* cited by examiner

SINGLE MOTOR, TWO AXIS SEARCHLIGHT SYSTEM

CROSS REFERENCES TO RELATED APPLICATION

This application claims priority to Indian Provisional Patent Application No. 202111008897, filed Mar. 3, 2021, the entire content of which is incorporated by the reference herein.

TECHNICAL FIELD

The present invention generally relates to searchlight systems, and more particularly relates to a single motor, two axis searchlight system.

BACKGROUND

Searchlight systems may be implemented onboard various vehicles, including airborne vehicles, land-based vehicles, and unmanned vehicles. Searchlights generally play a role in different land-based and airborne missions at night, including law enforcement missions, search and rescue missions, coast guard operations, offshore operations, emergency medical services, and the like, to illuminate areas of interest.

Regardless of the end-use vehicle and end-use purpose, many searchlight systems include two independent actuators. The actuators are used to rotate the searchlight about two perpendicular axes—a yaw (or pan) axis and a pitch (or tilt) axis. More specifically, one actuator is used to rotate the light about the yaw axis, and the other actuator is used to rotate the light about the pitch axis.

During use, the actuators are directly exposed to the environment. Thus, a relatively high torque requirement and relatively harsh environmental conditions may be imposed on the actuators. These factors can lead to reduced reliability for the searchlight system. Moreover, relying on multiple actuators increases overall system, size, weight, and cost.

Hence, there is a need for a searchlight system that does not rely on multiple actuators to rotate the searchlight about two perpendicular axes, that does not have a relatively high torque requirement, and that is not exposed to environmental conditions. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a single motor, two axis searchlight system includes a shaft, a motor, a first plurality of light sources, and a controller. The shaft is mounted for rotation about a rotational axis. The motor is coupled to the shaft and is operable to rotate the shaft about the rotational axis. The first plurality of light sources are coupled to the shaft and are rotatable therewith about the rotational axis. The first plurality of light sources are disposed along a first plane that is disposed at a first angle relative to the rotational axis. The controller is in operable communication with the motor and the first plurality of light sources. The controller configured to: selectively energize the motor to thereby cause the first plurality of light sources to rotate about the rotational axis, and selectively energize one or more of the first plurality of light sources.

In another embodiment, single motor, two axis searchlight system includes a shaft, a motor, a first plurality of light sources, a second plurality of light sources, a first plurality of lenses, a second plurality of lenses, and a controller. The shaft is mounted for rotation about a rotational axis. The motor is coupled to the shaft and is operable to rotate the shaft about the rotational axis. The first plurality of light sources are coupled to the shaft and are rotatable therewith about the rotational axis. The first plurality of light sources are disposed along a first plane that is disposed at a first angle relative to the rotational axis. The second plurality of light sources are coupled to the shaft and are rotatable therewith about the rotational axis. The second plurality of light sources are disposed along a second plane that is disposed at a second angle relative to the rotational axis. The first plurality of lenses are disposed adjacent to the first plurality of light sources, and the second plurality of lenses are disposed adjacent to the second plurality of light sources. The controller is in operable communication with the motor, the first plurality of light sources, and the second plurality of light sources. The controller configured is to: selectively energize the motor to thereby cause the first and second plurality of light sources to rotate about the rotational axis, and selectively energize one or more of the first plurality of light sources or one or more of the second plurality of light sources to thereby cause a light beam to be emitted in a direction that varies about a non-rotational axis, the non-rotational axis perpendicular to the rotational axis.

In yet another embodiment, a single motor, two axis searchlight system includes a shaft, a motor, a first plurality of light sources, a second plurality of light sources, a transparent housing, and a controller. The shaft is mounted for rotation about a rotational axis. The motor is coupled to the shaft and is operable to rotate the shaft about the rotational axis. The first plurality of light sources are coupled to the shaft and are rotatable therewith about the rotational axis. The first plurality of light sources are disposed along a first plane that is disposed at a first angle relative to the rotational axis and are arranged in a first matrix pattern on the first plane, wherein the first matrix pattern has at least one first column and a plurality of first rows. The second plurality of light sources are coupled to the shaft and are rotatable therewith about the rotational axis. The second plurality of light sources are disposed along a second plane that is disposed at a second angle relative to the rotational axis and are arranged in a second matrix pattern on the second plane, wherein the second matrix pattern has at least one second column and a plurality of second rows. The transparent housing has at least the shaft, the first plurality of light sources, and the second plurality of light sources disposed therein. The controller is in operable communication with the motor, the first plurality of light sources, and the second plurality of light sources. The controller is configured to: selectively energize the motor to thereby cause the first and second plurality of light sources to rotate about the rotational axis, and selectively energize one or more of the first plurality of light sources in one of the first plurality of first rows or one or more of the second plurality of light sources in one of the plurality of second rows, to thereby cause a light beam to be emitted in a direction that varies about a non-rotational axis, the non-rotational axis perpendicular to the rotational axis.

Furthermore, other desirable features and characteristics of the single motor, two axis searchlight system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
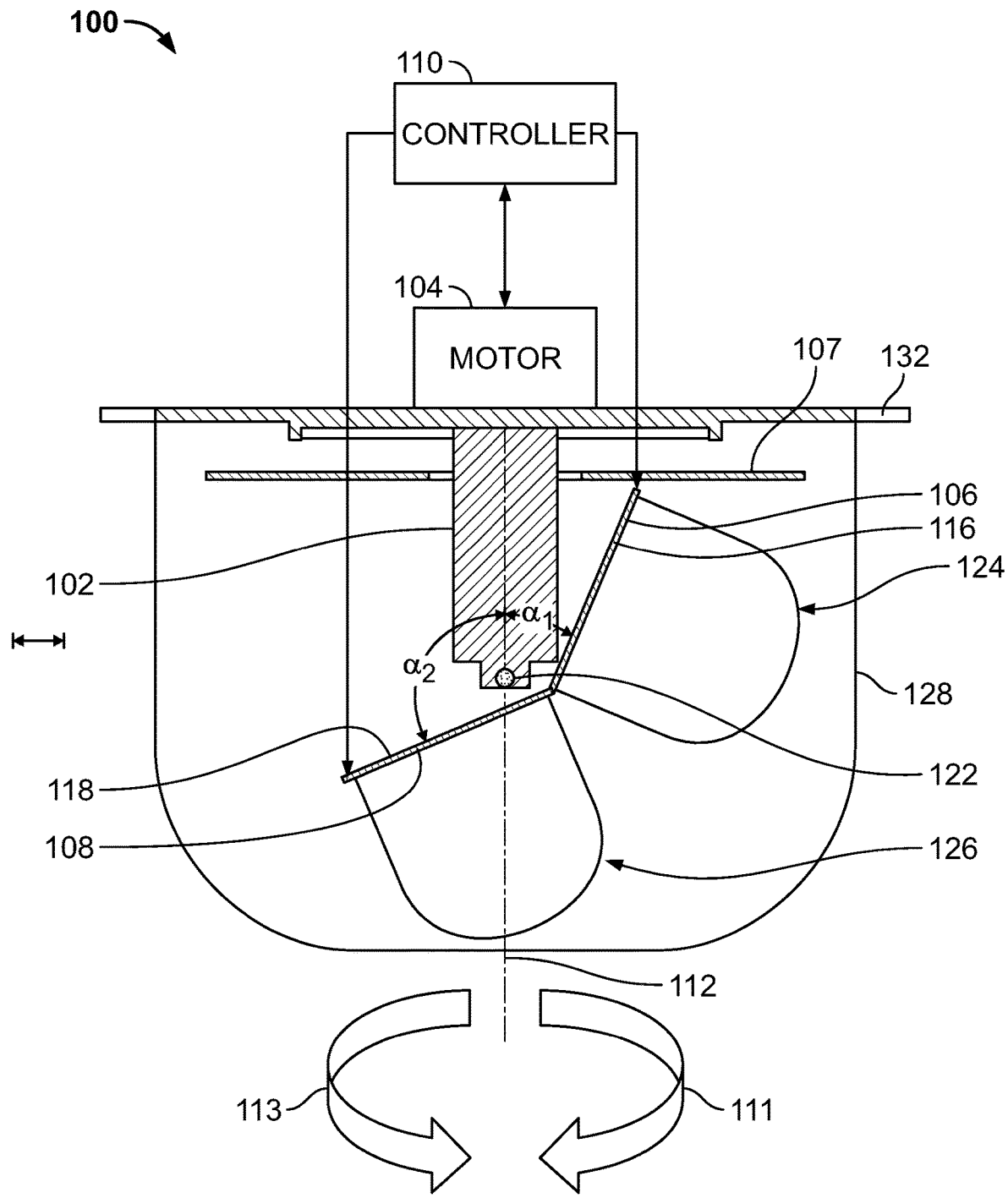
FIG. 1 depicts a simplified functional diagram of one embodiment of a single motor, two axis searchlight system.

Referring now to FIG. 1, a simplified functional diagram of one embodiment of a single motor, two axis searchlight system 100 is depicted and includes a shaft 102, a motor 104, a first plurality of light sources 106, a second plurality of light sources 108, and a controller 110. The shaft is mounted for rotation about a rotational axis 112. When the searchlight system 100 is mounted on a vehicle, such as an aerial vehicle, the rotational axis 112 typically corresponds to the yaw axis of the aerial vehicle. It will be appreciated, however, that the rotational axis could correspond to either the pitch axis or the roll axis, if needed or desired.

The motor 104 is coupled to the shaft 102 and is operable to rotate the shaft 102 about the rotational axis 112. More specifically, it is operable, in response to commands supplied by the controller, to rotate about the rotational axis 112 in either a first rotational direction 11 or a second rotational direction 113. It will be appreciated that the motor 104 may be any one of numerous types of AC or DC motors. In one particular embodiment, the motor 104 is a permanent magnet synchronous motor (PMSM).

The first plurality of light sources 106 are coupled to the shaft 102 and are rotatable therewith about the rotational axis 112. Similarly, the second plurality of light sources 108 are also coupled to the shaft 102 and are also rotatable therewith about the rotational axis 112. However, as FIG. 1 further depicts, the first plurality of light sources 106 are disposed along a first plane 116 that is disposed at a first angle ($\alpha_1$) relative to the rotational axis 112, and the second plurality of light sources 108 are disposed along a second plane 118 that is disposed at a second angle ($a_2$) relative to the rotational axis 112. It will be appreciated that each of the first and second plurality of light sources 106, 108 may be implemented using any one of numerous types of light emitting devices. In a preferred embodiment, each of the first plurality of light sources 106 and each of the second plurality of light sources 108 comprise solid-state light emitting devices. In a particular preferred embodiment, each of the solid-state devices is a light emitting diode (LED). It will additionally be appreciated that the first and second angles ($\alpha_1$, $\alpha_2$) may vary. In one particular embodiment, the first angle is 23-degrees and the second angle is 113-degrees.

The controller 110 is in operable communication with the motor 102, and with the first plurality of light sources 106 and the second plurality of light sources 108 via, for example, a printed circuit board 107. The controller 110 is configured to selectively energize the motor 104 to thereby cause the first and second plurality of light sources 106, 108 to rotate about the rotational axis 112. The controller 110 is also configured to selectively energize one or more of the first plurality of light sources 106 or one or more of the second plurality of light sources 108. As will become apparent from further description, selectively energizing different ones of the one or more first plurality of light sources 106 or different ones of the one or more second plurality of light sources 108 results in a light beam being emitted in a direction that varies about a non-rotational axis 122. As FIG. 1 depicts, the non-rotational axis 122 is perpendicular to the rotational axis 112.

To implement the above-described functionality, it is noted that, in a particular preferred embodiment, the first and second plurality of light sources 106, 108 are each arranged in a matrix pattern. That is, the first plurality of light sources 106 are arranged in a first matrix pattern on the first plane 116, and the second plurality of light sources 108 are arranged in a second matrix pattern on the second plane 118. It will be appreciated the number of columns and number rows of the first and second matrix patterns may vary. Preferably, however, the numbers of rows and columns is the same for both matrix patterns, and each matrix pattern has at least one column and a plurality of rows, where each element in each column corresponds to a single one of the light sources 106, 108.

Figure 2:
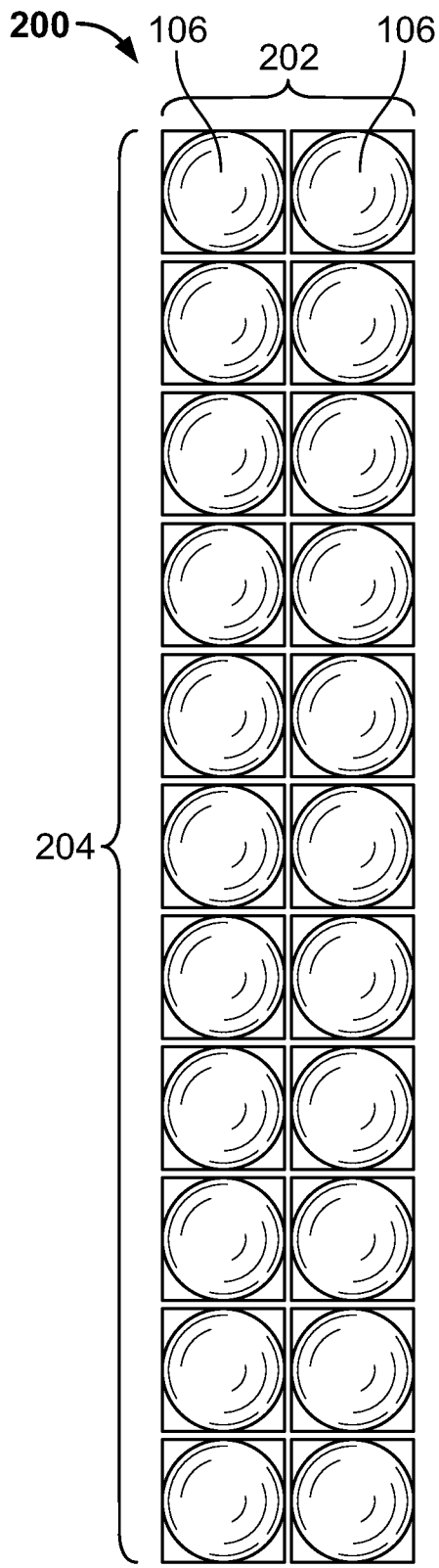
FIGS. 2 and 3 depict one embodiment of first and second matrix patterns, respectively, in which the first and second plurality of light sources may be arranged.
Figure 3:
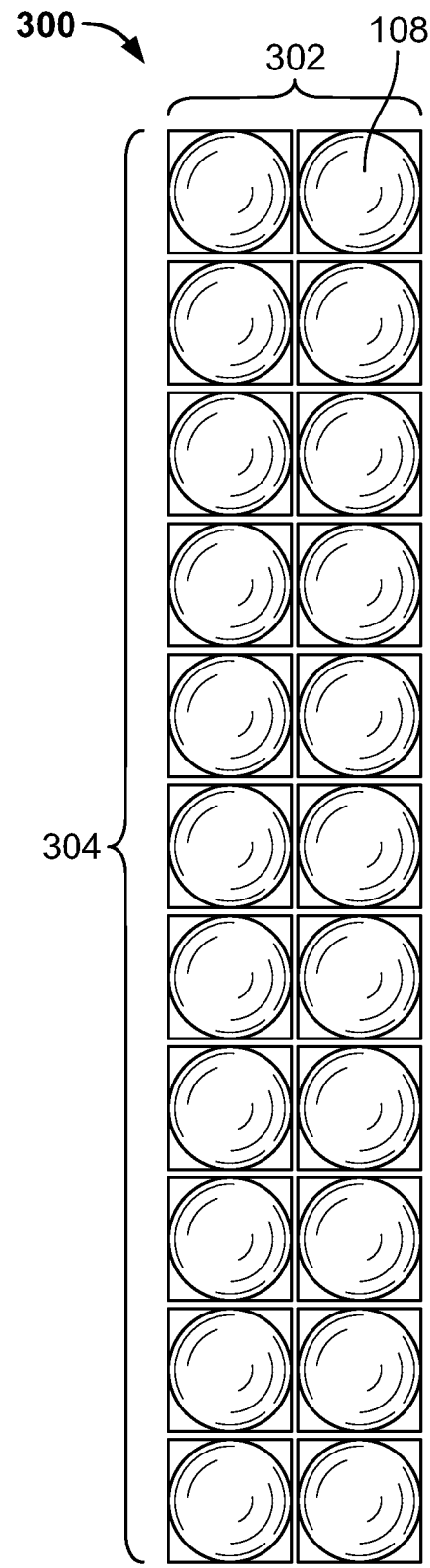
Figure 4:
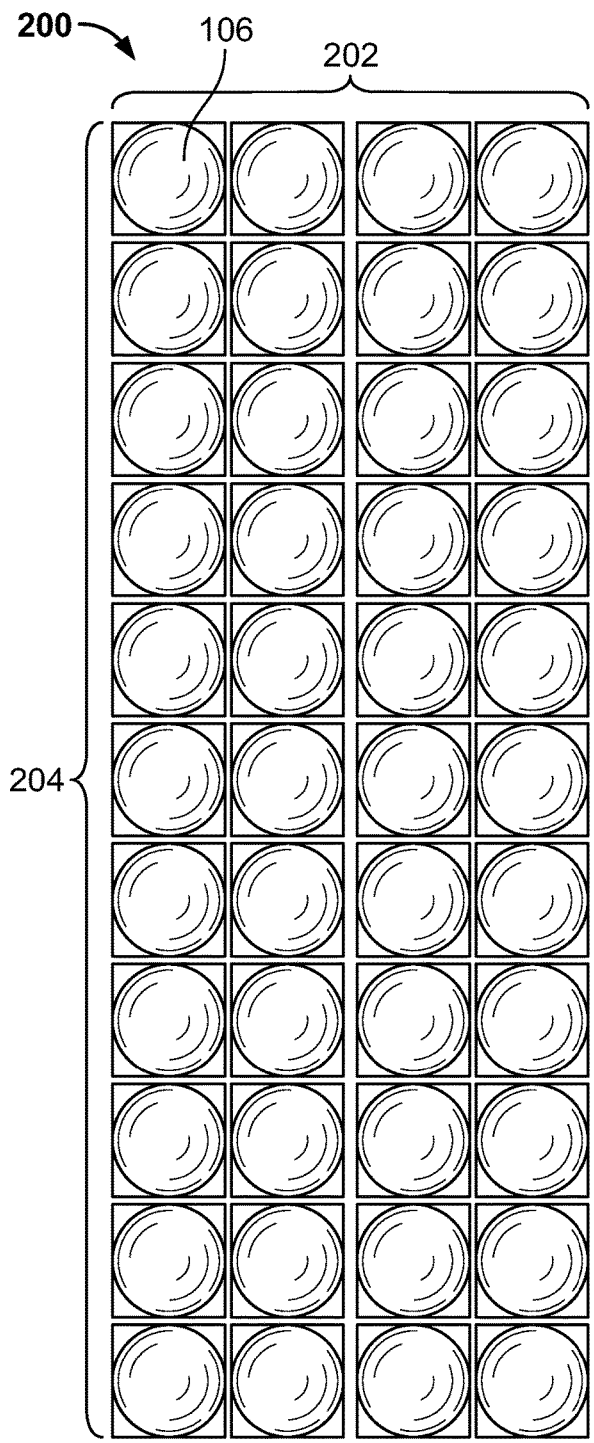
FIGS. 4 and 5 depict another embodiment of first and second matrix patterns, respectively, in which the first and second plurality of light sources may be arranged.
Figure 5:
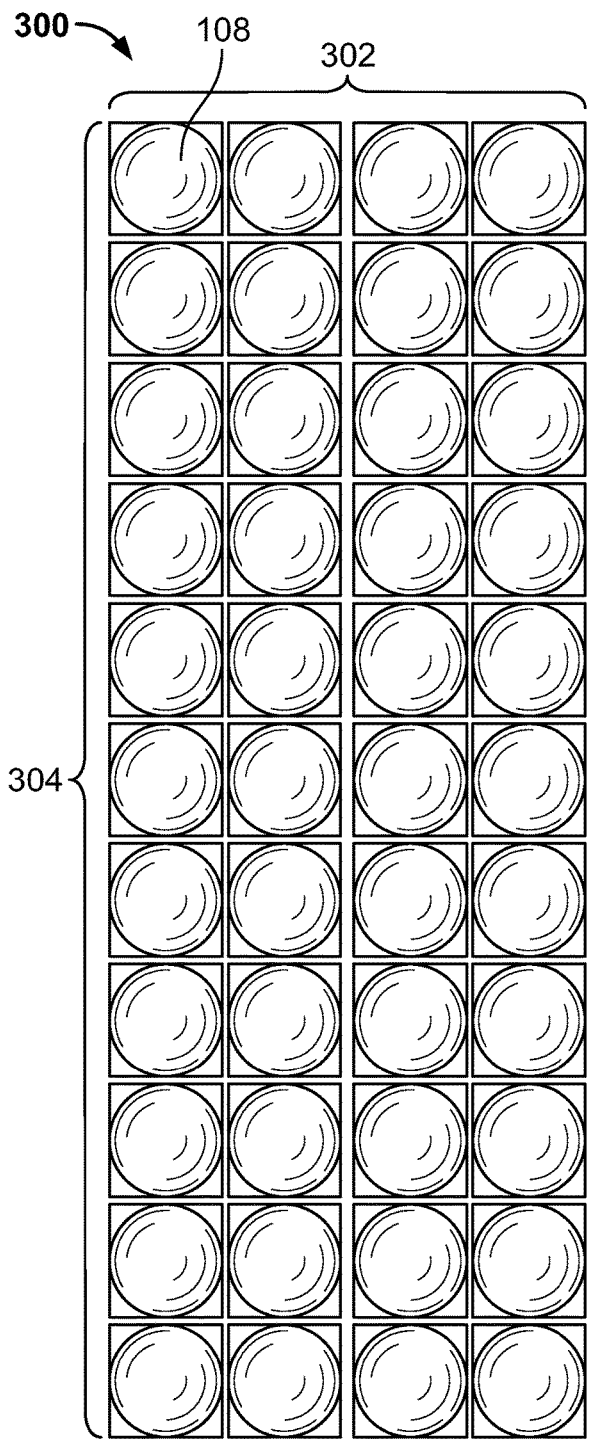

In one embodiment, which is shown in FIGS. 2 and 3, the first matrix pattern 200 has two first columns 202 and eleven first rows 204, and the second matrix pattern 300 has two second columns 302 and eleven second rows 304. Thus, the first and second plurality of light sources 106, 108 each comprise 22 light emitting devices. In yet another embodiment, which is shown in FIGS. 4 and 5, the first matrix pattern 200 has four first columns 202 and eleven first rows 204, and the second matrix pattern 300 has four second columns 302 and eleven second rows 304. Thus, the first and second plurality of light sources 106, 108 each comprise 44 light emitting devices.

Regardless of the number columns and rows that comprise the first and second matrix patterns 200, 300, it is noted that the light emitting devices that comprise each first row 204 are electrically connected in series, and the light emitting devices that comprise each second row 304 are also electrically connected in series. With this arrangement, and as was alluded to above, the controller 110 is configured to selectively energize the first plurality of light sources 106 in one of the first plurality of first rows 202 or the second plurality of light sources 108 in one of the plurality of second rows 204. In doing so, a light beam is emitted in a direction that varies about the non-rotational axis 122, without the need for a second motor (or other source of motive force). As may be appreciated by persons skilled in the art, the intensity of the emitted light beam can be varied by, for example, varying the number of columns 202, 302 in each matrix pattern 200, 300.

Returning momentarily to FIG. 1, it is seen that a first lens assembly 124 is disposed adjacent to the first plurality of light sources 106 and a second lens assembly 126 is disposed adjacent to the second plurality of light sources 108. Although each lens assembly 124, 126 could comprise a single lens, in a particular embodiment each lens assembly 124, 126 comprises a plurality of lenses. That is, the first lens assembly 124 comprises a first plurality of lenses that are disposed adjacent to the first plurality of light sources 106, and the second lens assembly 126 comprises a second plurality of lenses that disposed adjacent to the second plurality of light sources 108.

Figure 6:
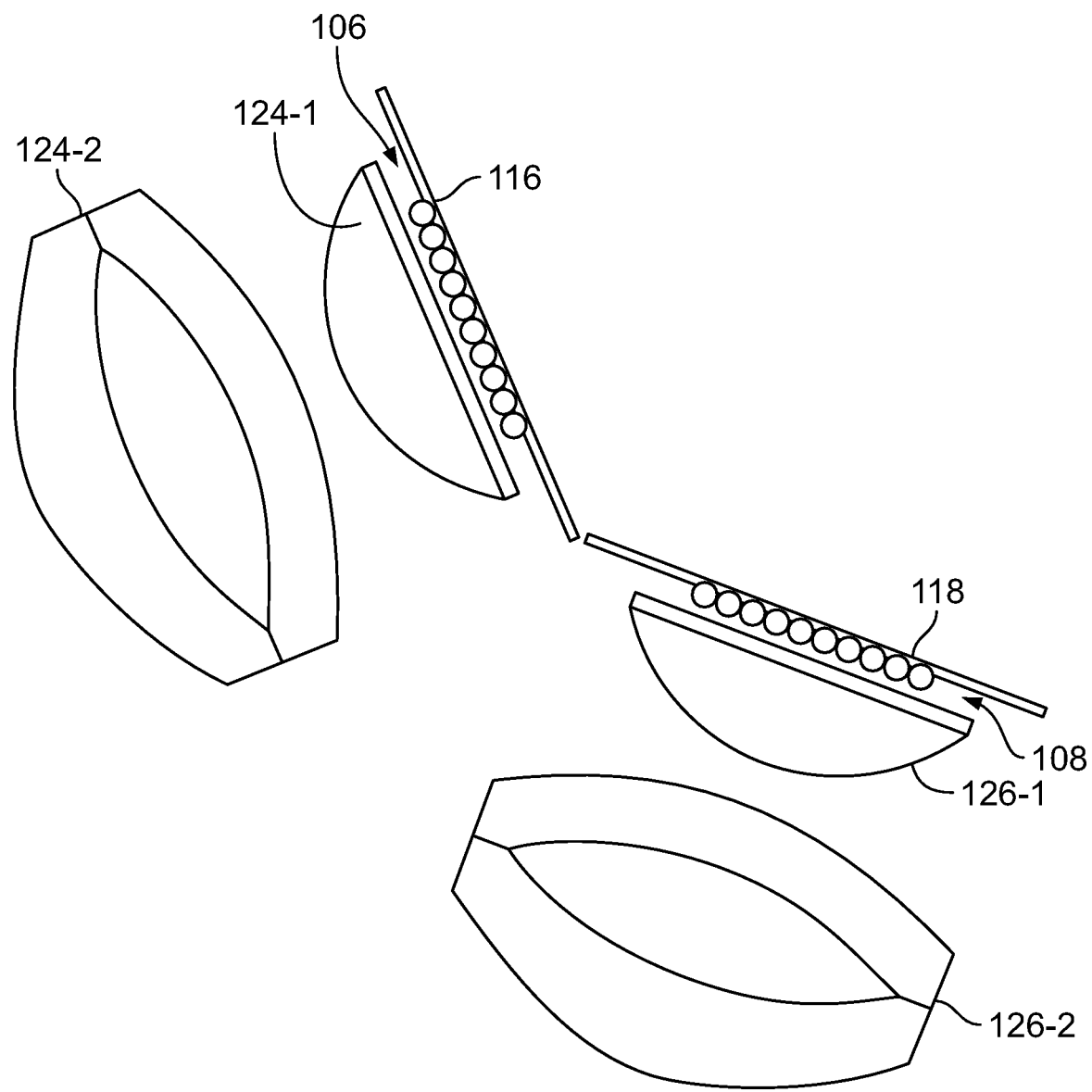
FIG. 6 depicts a side view of a portion of the system of FIG. 1, showing more clearly an arrangement of lens assemblies.

It will be appreciated that the number of lenses that comprise the first and second lens assemblies 124, 126 may vary. In one particular embodiment, which is depicted in FIG. 6, the first lens assembly 124 comprises a first lens 124-1 and a second lens 124-2, and the second lens assembly 126 comprises a third lens 126-1 and a fourth lens 126-2. The lenses are arranged such that the first lens 124-1 is disposed between the first plurality of light sources 106 and the second lens 124-2, and the third lens 126-1 is disposed between the second plurality of light sources 108 and the fourth lens 126-2. It will additionally be appreciated that the type of lenses used for each of the lens assemblies 124, 126 may vary. In one particular embodiment, however, the first and third lenses 124-1, 126-1 are both collimating lenses, and the second and fourth lenses 124-2, 126-2 are both aspheric condensing lenses.

Figure 7:
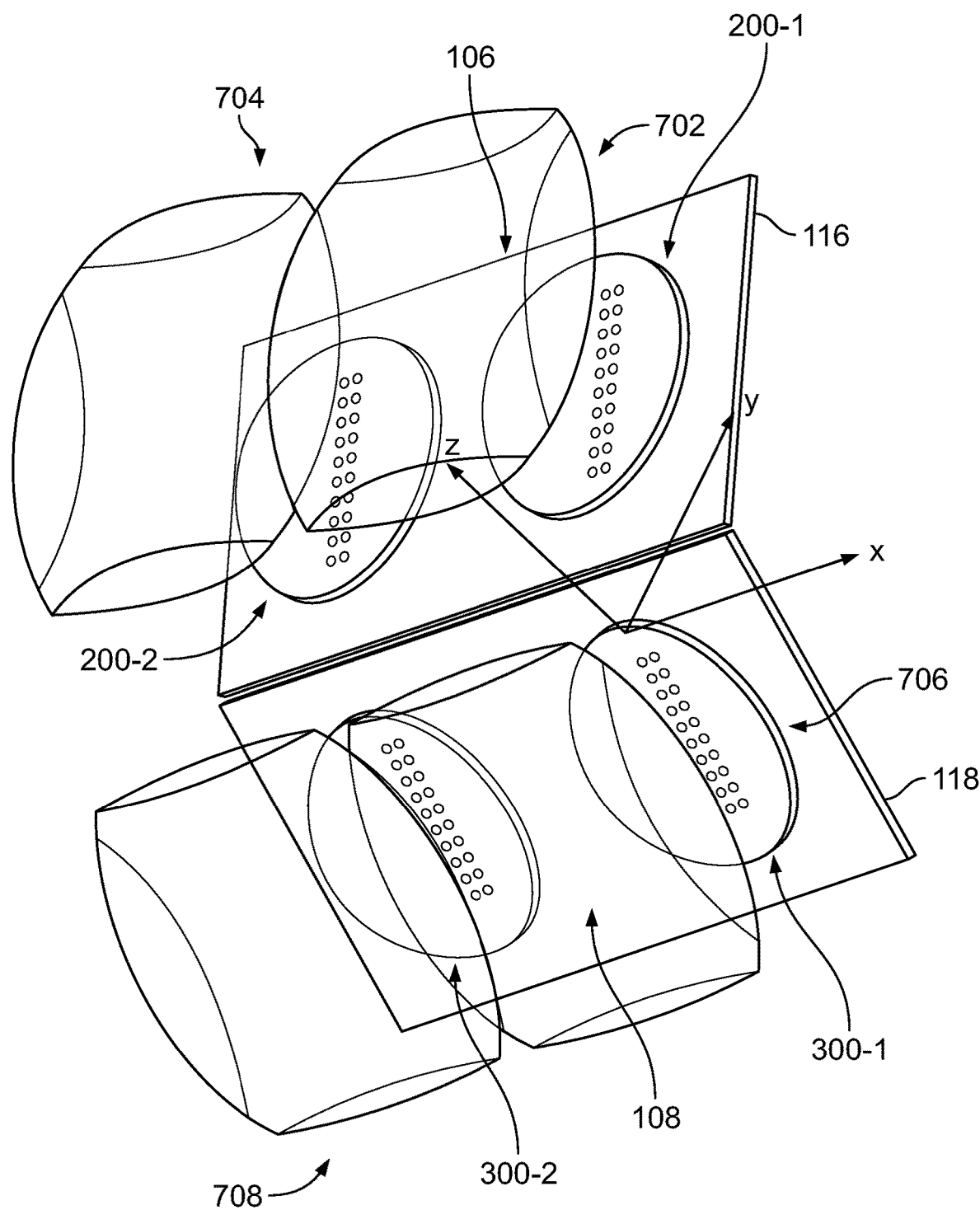
FIG. 7 depicts a plan view of a portion of another embodiment of the single motor, two axis searchlight system.

Before proceeding further, it is noted that in some embodiments, the first plurality of light sources 106 may be arranged on the first plane 116 in a plurality of spaced apart first matrix patterns 200-1, 200-2, . . . 200-N, and the second plurality of light sources 108 may be arranged on the second plane 118 in plurality of spaced apart second matrix patterns 300-1, 300-2, . . . 300-N. One such embodiment is depicted in FIG. 7. In this embodiment, the first plurality of light sources 106 are arranged on the first plane 116 in two spaced apart first matrix patterns 200-1, 200-2, and the second plurality of light sources 108 are arranged on the second plane 118 in two spaced apart second matrix patterns 300-1, 300-2. As FIG. 7 also depicts, this embodiment includes a separate lens assembly for each different matrix pattern. Thus, there are four lens assemblies—a first lens assembly 702, a second lens assembly 704, a third lens assembly 706, and a fourth lens assembly 708, each of which comprises two lenses.

Returning once again to FIG. 1, it is seen that at least the shaft 102, the first plurality of light sources 106, and the second plurality of light sources 108 are disposed all disposed within a transparent housing 128. As may be appreciated, and as FIG. 1 further depicts, various other components, such as the first and second lens assemblies 124, 126, and the printed circuit board 107 may also be disposed within the transparent housing 128. The transparent housing 128 is preferably coupled to a mounting plate 132, which may be used to mount the searchlight system 100 to a vehicle, such as an aircraft.

Preferably, the motor 104 and shaft 102 are configured such that the first and second plurality of light sources 106, 108, and thus the emitted light beam, may rotate about the rotational axis 112 over a total range of at least 240-degrees (e.g., ±120-degrees). Moreover, the first and second plurality of light sources 106, 108 are disposed such that the direction that the light beam is emitted varies over a total range of approximately 220-degrees (e.g., ±110-degrees) about the non-rotational axis 122.

Figure 8:
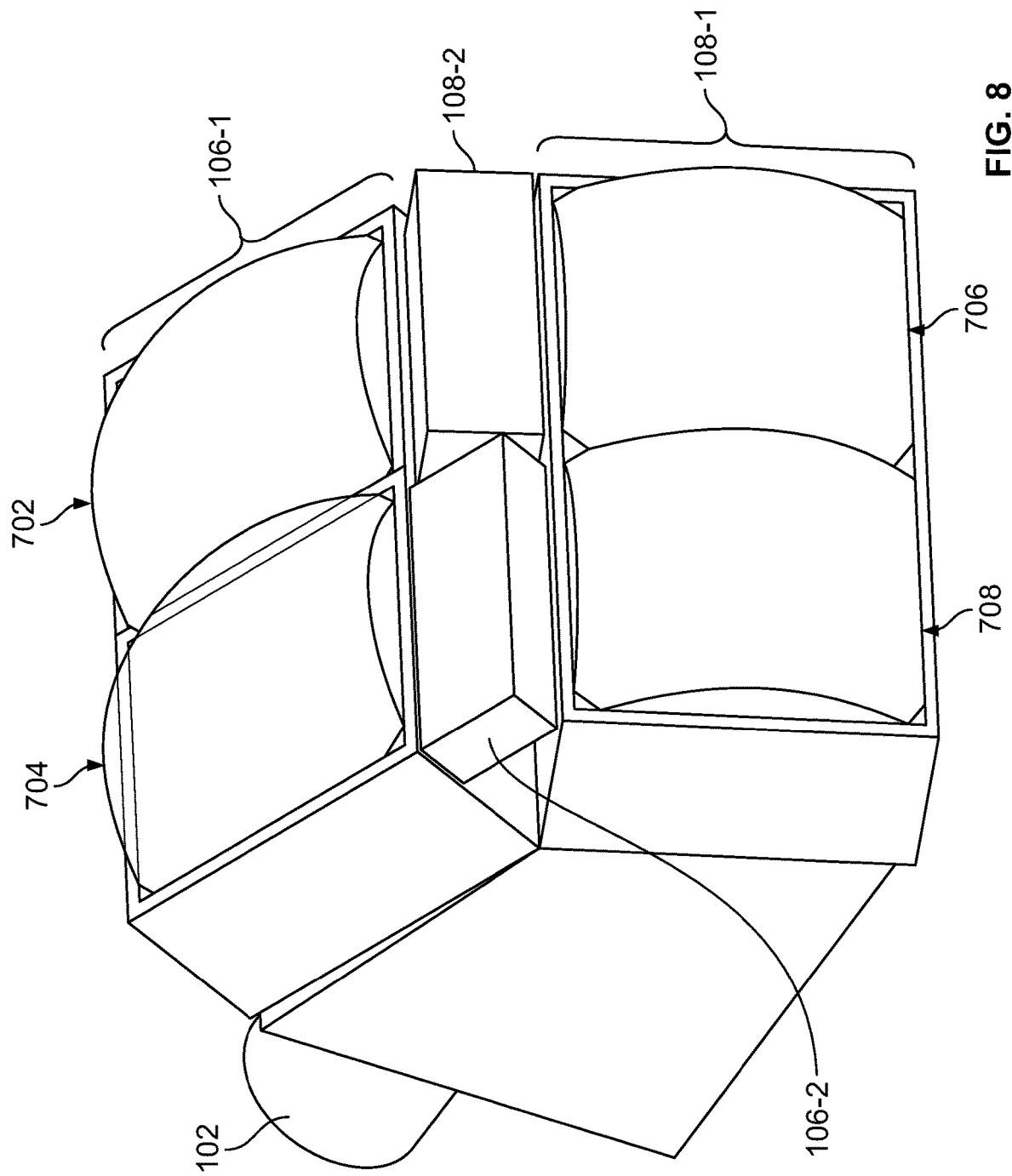
FIG. 8 depicts a simplified plan view of another embodiment of a single motor, two axis searchlight system.

It was previously noted that each of the first and second plurality of light sources 106, 108 may be implemented using any one of numerous types of light emitting devices. In some embodiments, each of the first and second plurality of light sources 106, 108 are devices that emit visible light, or each are implemented using devices that emit infrared (IR) light. In other embodiments, a first portion of the light sources 106, 108 are implemented using devices that emit visible light and a second portion of the light sources are implemented using devices that emit IR light. One embodiment of this latter configuration is depicted in FIG. 8. In this embodiment, a first portion of the first plurality of light emitting devices 106-1 are implemented using devices that emit visible light and a second portion of the first plurality of light sources 106-2 are implemented using devices that emit IR light. Similarly, a first portion of the second plurality of light emitting devices 108-1 are implemented using devices that emit visible light and a second portion of the second plurality of light sources 108-2 are implemented using devices that emit IR light. It is noted that the devices that emit IR light 106-2, 108-2 are not covered by the lens assemblies 702, 704, 706, 708. This, at least in part, is because the IR light emitted by these devices 106-2, 108-2 has a higher intensity than the visible light emitted by the visible light emitting devices 106-1, 108-1.

Figure 9:
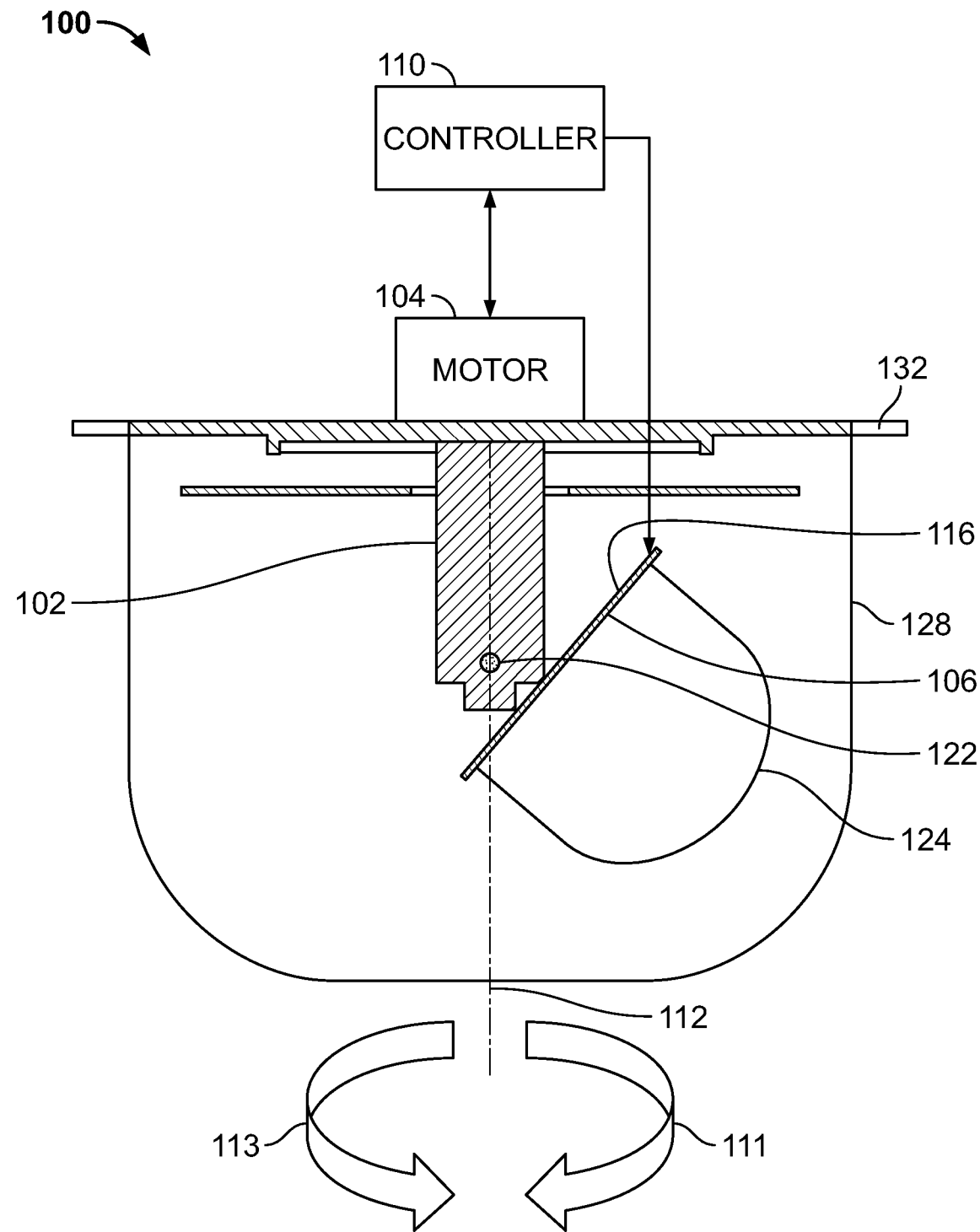
FIG. 9 depicts a simplified functional diagram of another embodiment of a single motor, two axis searchlight system.
Figure 10:
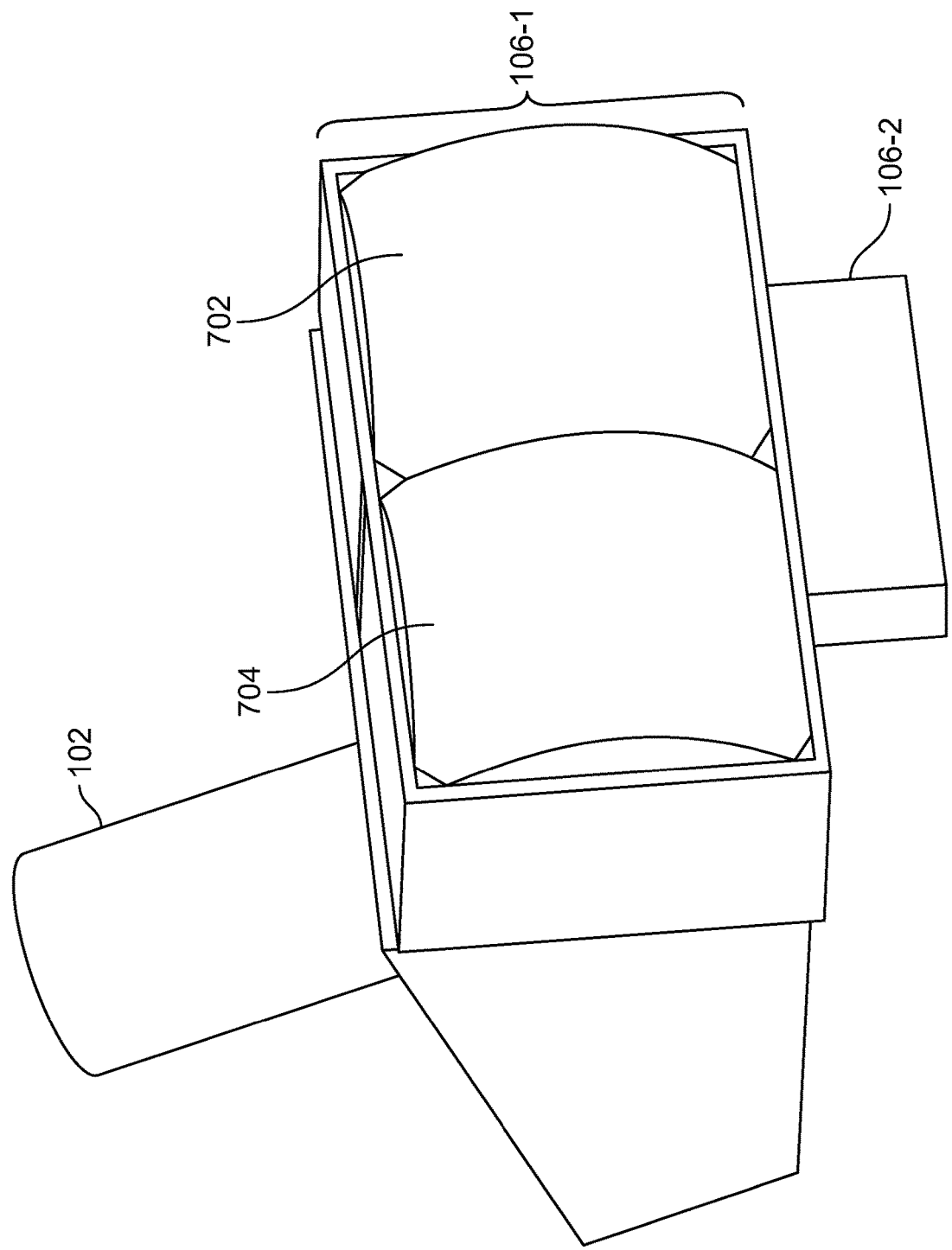
FIG. 10 depicts a simplified plan view of another embodiment of a single motor, two axis searchlight system.

The embodiments described thus far are implemented using pluralities of first and second light sources 106, 108 disposed along first and second planes 116, 118, respectively. In other embodiments, however, the system 100 may be implemented with more or less than two pluralities of visible light sources disposed along more than first and second planes. For example, in other embodiments, such as the one depicted in FIG. 9, the single motor, two axis searchlight system 100 is implemented with only the first plurality of visible light sources 106 disposed along the first plane 116 at the first angle (a') relative to the rotational axis 112. As with the embodiment depicted in FIG. 1, it will be appreciated that the first angle ($\alpha_1$) may vary and may be selected to meet desired operational and functional requirements. As FIG. 10 depicts, this embodiment may also be configured such that a first portion of the first plurality of light emitting devices 106-1 are implemented using devices that emit visible light and a second portion of the first plurality of light sources 106-2 are implemented using devices that emit IR light.

The single motor, two axis searchlight system 100 described herein does not rely on multiple actuators to rotate the light beam about two perpendicular axes. Moreover, because it is not exposed to environmental conditions, it has a relatively low torque requirement for the single motor. With less moving (and overall number) of parts, the disclosed system is lighter weight and less costly than existing two axis searchlight systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A single motor, two axis searchlight system, comprising:
    a shaft mounted for rotation about a rotational axis;
    a motor coupled to the shaft and operable to rotate the shaft about the rotational axis;
    a first plurality of light sources coupled to the shaft and rotatable therewith about the rotational axis, the first plurality of light sources disposed along a first plane that is disposed at a first angle relative to the rotational axis;
    a second plurality of light sources coupled to the shaft and rotatable therewith about the rotational axis, the second plurality of light sources disposed along a second plane that is disposed at a second angle relative to the rotational axis;
    a first plurality of lenses disposed adjacent to the first plurality of light sources, the first plurality of lenses comprising a first lens and a second lens, the first lens disposed between the first plurality of light sources and the second lens;
    a second plurality of lenses disposed adjacent to the second plurality of light sources, the second plurality of lenses comprising a third lens and a fourth lens, the third lens disposed between the second plurality of light sources and the fourth lens; and
    a controller in operable communication with the motor, the first plurality of light sources, and the second plurality of light sources, the controller configured to:
        selectively energize the motor to thereby cause the first plurality of light sources to rotate about the rotational axis,
        selectively energize one or more of the first plurality of light sources, and selectively energize one or more of the second plurality of light sources.

2. The system of claim 1, wherein selectively energizing different ones of the one or more first plurality of light sources or different ones of the one or more second plurality of light sources results in a light beam being emitted in a direction that varies about a non-rotational axis, the non-rotational axis perpendicular to the rotational axis.

3. The system of claim 2, wherein:
    the motor and shaft are configured to allow rotation of the first and second plurality of light sources over a first range of degrees about the rotational axis; and
    the first and second plurality of light sources are disposed such that the direction that the light beam is emitted varies over a second range of degrees about the non-rotational axis.

4. The system of claim 1, wherein:
    the first plurality of light sources are arranged in a first matrix pattern on the first plane, the first matrix pattern having at least one first column and a plurality of first rows; and
    the second plurality of light sources are arranged in a second matrix pattern on the second plane, the second matrix pattern having at least one second column and a plurality of second rows.

5. The system of claim 1, wherein the controller is further configured to selectively energize one or more of the first plurality of light sources in one of the first plurality of first rows or one or more of the second plurality of light sources in one of the plurality of second rows.

6. The system of claim 1, further comprising:
    a transparent housing, within which at least the shaft, the first plurality of light sources, and the second plurality of light sources are disposed.

7. The system of claim 1, wherein each of the first plurality of light sources and each of the second plurality of light sources comprise solid-state devices.

8. The system of claim 7, wherein the solid-state devices comprise visible light emitting devices.

9. The system of claim 7, wherein the solid-state devices comprise infrared (IR) light emitting devices.

10. The system of claim 7, wherein:
    a first portion of the solid-state devices comprise visible light emitting devices; and
    a second portion of the solid-state devices comprise IR light emitting devices.

11. A single motor, two axis searchlight system, comprising:
    a shaft mounted for rotation about a rotational axis;
    a motor coupled to the shaft and operable to rotate the shaft about the rotational axis;
    a first plurality of light sources coupled to the shaft and rotatable therewith about the rotational axis, the first plurality of light sources disposed along a first plane that is disposed at a first angle relative to the rotational axis and arranged in a first matrix pattern on the first plane, wherein the first matrix pattern has at least one first column and a plurality of first rows;
    a second plurality of light sources coupled to the shaft and rotatable therewith about the rotational axis, the second plurality of light sources disposed along a second plane that is disposed at a second angle relative to the rotational axis and arranged in a second matrix pattern on the second plane, wherein the second matrix pattern has at least one second column and a plurality of second rows;

a first plurality of lenses disposed adjacent to the first plurality of light sources, the first plurality of lenses comprising a first lens and a second lens, the first lens disposed between the first plurality of light sources and the second lens;

a second plurality of lenses disposed adjacent to the second plurality of light sources, the second plurality of lenses comprising a third lens and a fourth lens, the third lens disposed between the second plurality of light sources and the fourth lens;

a transparent housing, within which at least the shaft, the first plurality of light sources, and the second plurality of light sources are disposed; and a controller in operable communication with the motor, the first plurality of light sources, and the second plurality of light sources, the controller configured to:

selectively energize the motor to thereby cause the first and second plurality of light sources to rotate about the rotational axis, and selectively energize one or more of the first plurality of light sources in one of the first plurality of first rows or one or more of the second plurality of light sources in one of the plurality of second rows, to thereby cause a light beam to be emitted in a direction that varies about a non-rotational axis, the non-rotational axis perpendicular to the rotational axis.

12. The system of claim 11, wherein:

the motor and shaft are configured to allow rotation of the first and second plurality of light sources over a first range of degrees about the rotational axis; and the first and second plurality of light sources are disposed such that the direction that the light beam is emitted varies over a second range of degrees about the non-rotational axis.

\* \* \* \* \*